United States Patent [19]
Bates

[11] Patent Number: 5,921,175
[45] Date of Patent: Jul. 13, 1999

[54] HOT EMBOSSING MACHINE AND METHOD OF USING

[76] Inventor: Robert Ernest Bates, 205 Station Road, Penrose, Auckland, New Zealand

[21] Appl. No.: 08/863,871

[22] Filed: May 27, 1997

[51] Int. Cl.⁶ .................. B31F 1/07; B44B 5/00
[52] U.S. Cl. ................ 101/32; 101/23; 101/25
[58] Field of Search ............... 101/6, 8, 23, 25, 101/31, 32

[56] References Cited

U.S. PATENT DOCUMENTS

| | | | |
|---|---|---|---|
| 719,238 | 1/1903 | Loomis | 101/25 |
| 753,662 | 3/1904 | Bresemann | 101/23 |
| 1,408,633 | 3/1922 | Parsons | 101/23 |
| 2,202,110 | 5/1940 | Maurer | 101/25 |
| 2,472,883 | 6/1949 | Bergstein | 101/23 |
| 2,612,102 | 9/1952 | Buckley et al. | 101/8 |
| 3,124,063 | 3/1964 | Putzler et al. | 101/6 |
| 3,166,008 | 1/1965 | Lewandoski | 101/6 |
| 3,545,371 | 12/1970 | Reist | 101/23 |
| 3,942,440 | 3/1976 | Ritzerfeld | 101/401.1 |
| 4,462,852 | 7/1984 | Custor | 101/470 |
| 4,641,575 | 2/1987 | Cavagna | 101/23 |
| 4,776,912 | 10/1988 | Laval | 101/23 |

*Primary Examiner*—Christopher A. Bennett
*Assistant Examiner*—Leslie Grohusky
*Attorney, Agent, or Firm*—Smith-Hill and Bedell

[57] ABSTRACT

An apparatus for embossing panels used in building utilises low wattage blowers to heat a zone upstream of the embossing site. Embossing is carried out by feeding a panel through the nip of an embossing wheel and an anvil roller. A track is rolled into the hard panel surface and various decorative effects are achieved by using side by side arrangements of wheels. The tendency to panel splitting is reduced by the provision of hot localised zones. The apparatus is sufficiently wide to receive the panel in both axes.

29 Claims, 3 Drawing Sheets

HOT EMBOSSING MACHINE AND METHOD OF USING

This invention concerns apparatus for embossing panels, linings, boards, strips and the like as used in building, and the embossed product therefrom.

The harder the panels are the more they resist scratching and surface deterioration. The latter provides protection for bacteria. A high threshold hardness is advisable to resist deterioration. The hardness produces the optical appreciation of the embossed line. The hardness also tends to cause the panel to split during the embossing operation.

Embossing pressure cannot be reduced if the necessary depth is to be achieved. If the composition of the substrate is changed it must be changed at manufacture and large producers will not make small batches of suitable density.

This invention addresses the problem.

SUMMARY OF THE INVENTION

This invention provides in a panel embossing machine, the combination of an embossing station and means for creating a hot zone adjacent the embossing station (upstream), said embossing station comprising a work surface at which the embossing station is located, an aperture defined by the work surface at the embossing station, a drivable anvil roll beneath the aperture and an embossing roll forming a nip with the anvil roll, said means for creating the hot zone comprising a device for raising the temperature of a panel introduced to the work surface into the nip.

A feed speed in the range 2–15 m/min, preferably 8–15 m/min is feasible depending upon the heat source and the conductivity of the panel.

A compact heat zone may be created in the path of the tool which extends in a band along the tool path so as to heat the panel which cools as the tool progresses. The zone may be 10–40 mm wide.

The zone may be circular when the sheet is stationary and may be located 10–150 mm in front of the tool.

The heat may be applied by a jet of hot gas, usually air, to one or both surfaces of the panel. The temperature may be 50–120 degrees C. The temperature rise in the embossed site may be 20–50 degrees C.

Heating by electromagnetic energy is an alternative for example radio frequency heating but this requires an emitter and a receiver which is not easy to arrange in the presence of the metal feed table.

When the embossing operation begins preferably the heating starts while the panel is stationary in order soften the multiple sites on the machine. The panel enters the nip of the anvil wheel and embossing wheel. The panel feeds slowly allowing the heating to precede the imposition of embossing pressure. The anvil wheel may be 500–600 mm in diameter. The embossing wheels may be 250–300 mm in diameter. Preferably, the diameter of the embossing wheel is 0.3–0.6 times the diameter of the anvil roll. The embossing wheel cross-section may be arcuate, V-shaped, or blunted V-shape. The embossing pressure may be 15–100 psi.

Wheels are convenient for embossing but stationary rubbing tools or orbital or compound motion tools for creating special effect may be used instead.

Rams may supply the embossing pressure. A series of rams may be set up for either equal pressure or individual pressures to obtain special effects.

DESCRIPTION OF THE DRAWINGS

One embodiment of the invention is now described with reference to the accompanying drawings in which.

DESCRIPTION OF THE EMBODIMENT

Figure 1:
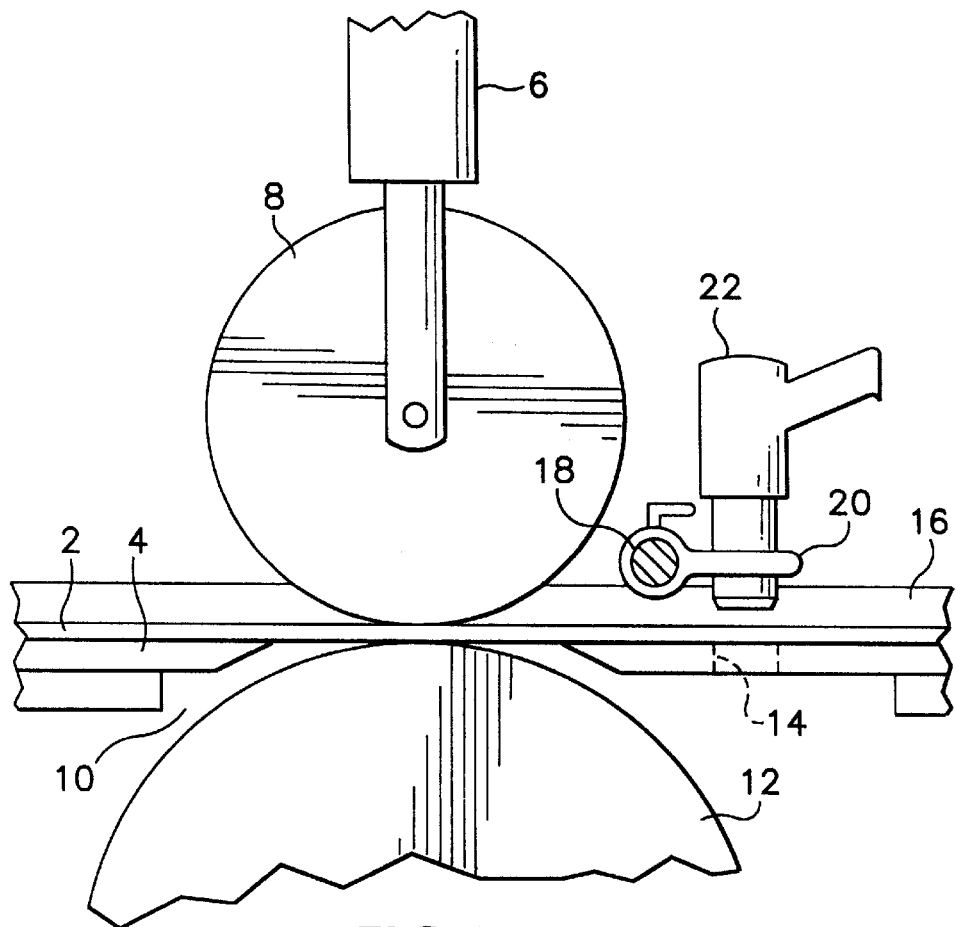
FIG. 1 is diagrammatic side view of a station of the machine.
Figure 2:
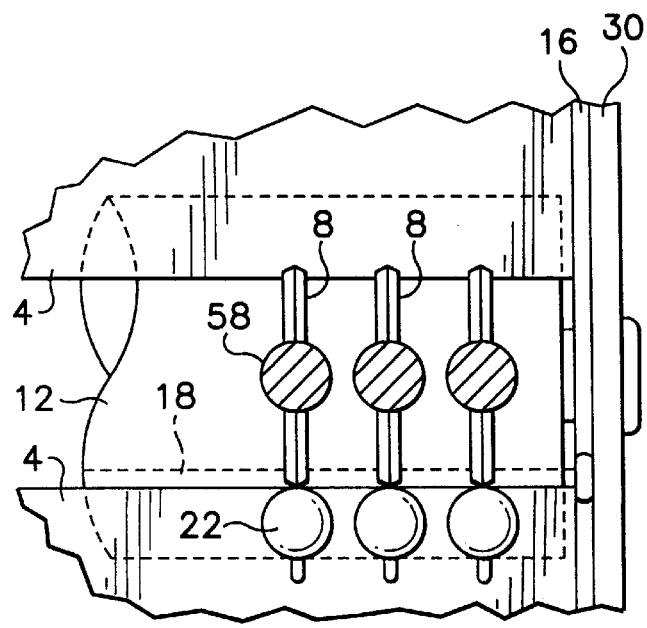
FIG. 2 is a sectional plan of the central part of the machine showing the heater dispositions.

The machine embosses 1200×2700 mm fibrocement panels 2 and has a smooth sheet plastic feed table 4 which extends across the length of the panel having an infeed table and an outfeed table. A tool bridge 6 carries a series of embossing wheels 8 (1 only shown). The tool bridge spans the 2700 mm length of the panel 2. The embossing sites all lie within a continuous gap or aperture 10 which extends across the width of the machine. The gap allows the ganged embossing wheels 8 to form nips with an anvil roll 12 which extends across the width of the machine. Close to the slots, lie the heating openings 14. Each heating opening is 75 mm dia and is located 80 mm upstream of the embossing site. Guide 16 ensures accurate insertion of the panel 2 into the nips.

A transverse bar 18 located upstream of the nips. Clamps 20 support hot air blowers 22 with nozzles directed normal to the panel. The opening 14 prevents heat build up in the table. The alternative positions for the blowers is beneath the table.

In practice the heaters are commercial paint strippers rated at about 300 w. The output is adjusted to pre heat the area to be embossed so that the temperature of the embossing site is raised sufficiently in relation to the feed speed of the panel to facilitate embossing with much less risk of splitting.

A feed speed of about 3 m\min is useful. A panel 2 is fed transversely with all blowers 22 ON. The panel is turned through 90 degrees about an axis perpendicular to its plane and fed longitudinally. The blowers continue while the panel feeds longitudinally, half the blowers discharging hot air through the apertures 14.

Figure 3:
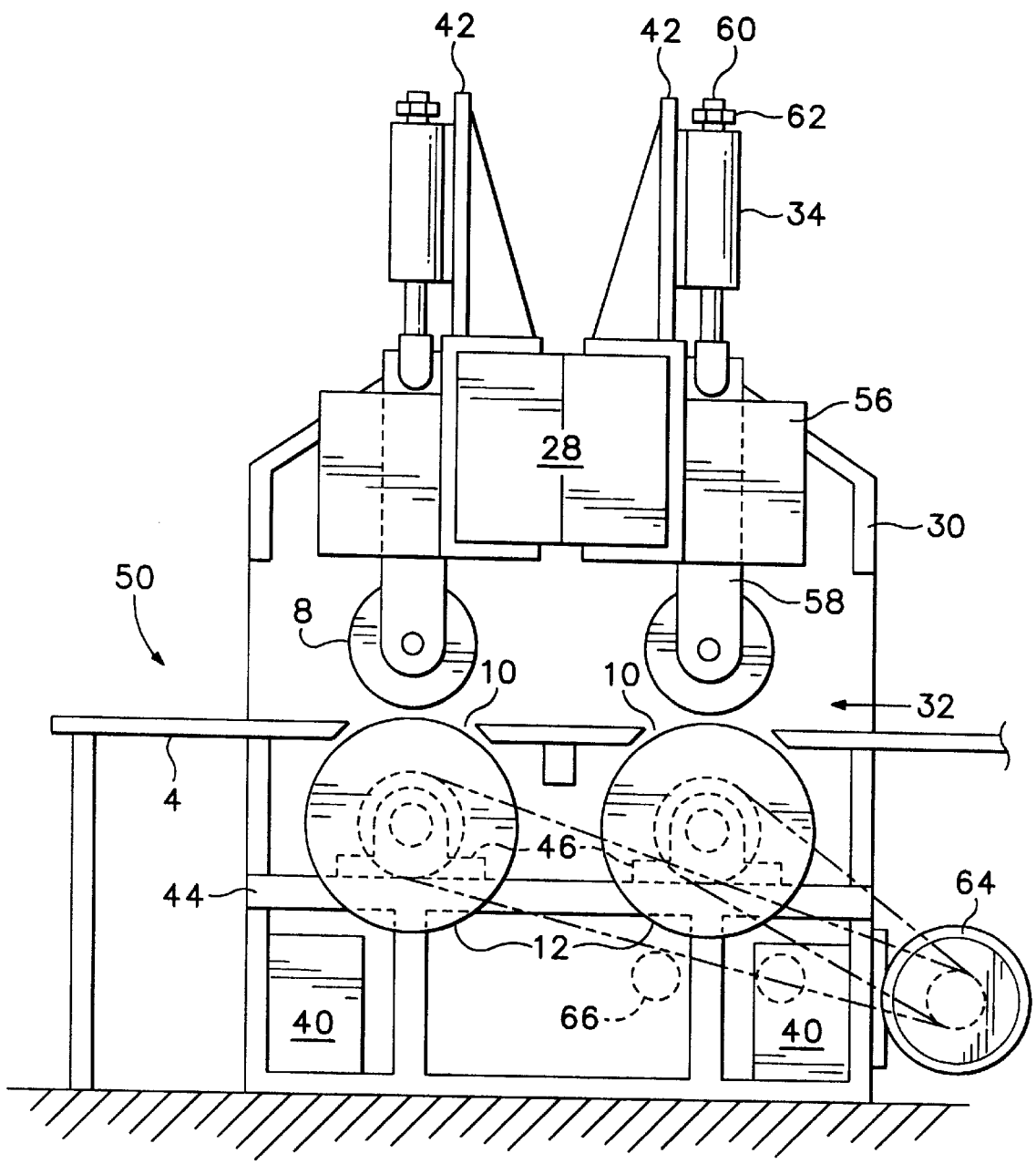
FIG. 3 is a side view of a machine of the type in which the heating stations are installed and showing the drives and pairs of staggered embossing rolls.

The general layout of the machine is described further as follows with reference to FIG. 3. A steel I-beam (not shown) extends across the width of the machine beneath the work table. A multiple tool bridge 6 is fixed to a pair of overhead beams 28. The latter are connected by end frames 30 so that together they define 2400×450 mm window 32.

The rams 34 are set up for equal pressure operation. The end frames 30 are connected by a pair of stretchers 40 at floor level and by the overhead beams 28. This assembly is made sufficiently stiff to resist the deflection of the embossing operation.

The anvil rolls are mounted in a bed 50 which includes flanges 44 on the end frames seat pairs of HD bearings 46. The bearings support two anvil rolls 12, 500 mm in diameter and 2800 mm long. An in-feed table 4, 1800 mm long rests on stretchers extending between the end frames 30.

Thirteen embossing wheels 8 create nips with each roll, twenty-six embossing grooves are therefore possible across the larger dimension of the panel. Each holder 56 has a bore in which the wheel holder 58 is a slide fit. The wheel 8 and holder 58 are urged downwardly toward the anvil roll 12 by the pneumatic ram 34 which is fixed to the tool bridge extensions 42. As the size of the nip determines the depth of the groove, the ram has a threaded rod 60 protruding from the upper end of the ram. The rod has a nut adjustment 62 which acts as a stop on the downward travel of the ram. The anvil rolls are chain driven by a motor and reduction gear box 64 with chain tensioners 66 at 12 rpm/min.

A run of panels is passed through the machine and stacked. The panels are then passed through the machine in the reverse direction but at 90 degrees. Accuracy is vital as the sheets must match exactly in installation.

Figure 4:
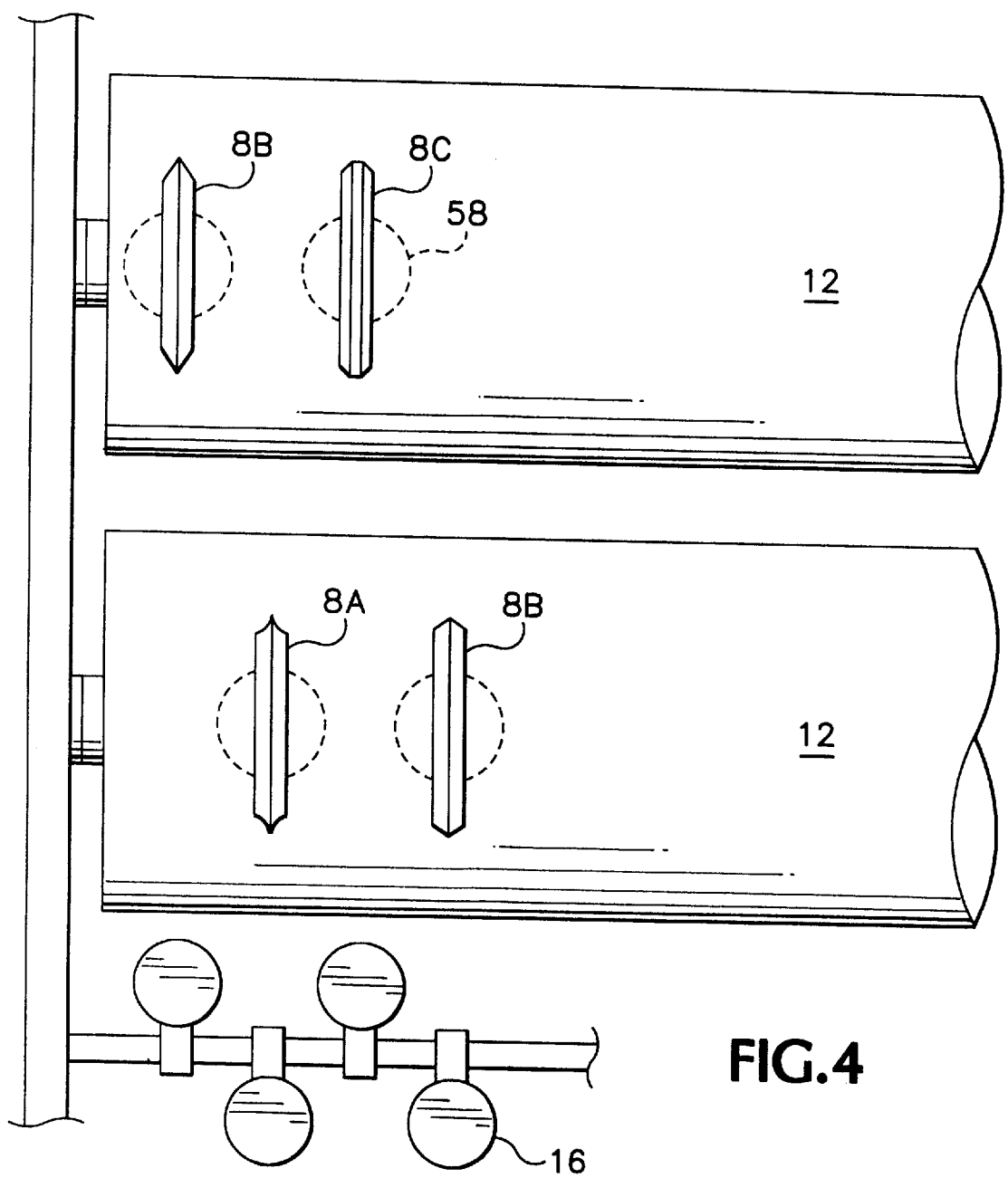
FIG. 4 is a top plan view illustrating optional features of the machine.

FIG. 4 illustrates two parallel anvil rolls 12 and two series of embossing wheels 8 providing nips with the two anvil rolls respectively. The two series of embossing wheels are staggered to permit closer spacing of the embossed lines on the panel. FIG. 4 illustrates the embossing wheels having arcuate (8A), V-shaped (8B) and blunted V-shaped (8C) cross sections.

In another version there are twenty-six embossing wheels across the width of the machine.

We have found the advantages of the above embodiment to be
1 Cheapness and reliability
2 Reduction in incidence of splitting
3 Imitation tile and other effects are possible

I claim:

1. A machine for embossing panels, comprising:
    an embossing station at which the machine includes a work support member which defines an aperture at the embossing station and supports a panel to be embossed as it is fed in a feed direction through the embossing station, an anvil roll beneath the aperture in the work support member, and a plurality of embossing wheels above the anvil roll, the embossing wheels being spaced apart longitudinally of the anvil roll and each defining a nip with the anvil roll,
    a drive mechanism coupled to the anvil roll for driving the anvil roll to feed the panel in the nip through the embossing station in said feed direction, and
    a heater upstream of the embossing station with respect to said feed direction for supplying heat energy to a plurality of localized hot zones of the panel without contact with the panel, the hot zones being aligned with the embossing wheels respectively along said feed direction so that the panel is heated in respective bands as it is fed toward the embossing station.

2. A machine according to claim 1, wherein each band is 10–40 mm wide.

3. A machine according to claim 1, wherein each hot zone is circular and is located 10–150 mm upstream of each embossing wheel.

4. A machine according to claim 1, wherein the ratio of the diameter of the embossing wheels to the diameter of the anvil roll is 0.3–0.6.

5. A machine according to claim 1, wherein each embossing wheel is of arcuate, V-shaped or blunted V-shaped section.

6. A machine according to claim 1, wherein the work support member comprises a guideway having an infeed table and an outfeed table separated by said aperture.

7. A machine according to claim 1, wherein the anvil roll is 500–600 mm in diameter.

8. A machine according to claim 1, wherein each embossing wheel is 250–300 mm in diameter.

9. A machine according to claim 1, wherein the anvil roll is mounted in a bed and the embossing wheels are mounted in a bridge.

10. A machine according to claim 1, wherein the embossing wheels are mounted in a rigid bridge.

11. A machine according to claim 1, wherein the anvil roll is mounted in a bed and the embossing rolls are mounted in a bridge extending over the bed.

12. A machine according to claim 1, wherein the heater includes a plurality of hot air blowers for supplying heat energy to the hot zones respectively.

13. A machine according to claim 12, wherein the work support member is formed with an opening aligned with each hot air blower for dissipating heat in the event that the opening is not obstructed by a panel.

14. A machine according to claim 1, wherein the embossing wheels are mounted in respective wheel holders which permits rise and fall of the embossing wheels.

15. A machine according to claim 14, wherein each wheel holder has a slide with an upper end and a lower end and the embossing wheel is carried at the lower end of the slide.

16. A machine according to claim 15, comprising a ram effective at the upper end of the slide and urging the embossing wheel toward the anvil roll.

17. A machine according to claim 16, wherein each holder and embossing wheel form an embossing assembly and the embossing assembly has an adjuster which permits fine adjustment of embossing depth.

18. A machine according to claim 17, wherein the ram has a screw operated stroke adjustment.

19. A machine for embossing panels, comprising:
    an embossing station at which the machine includes a work support member which defines an aperture at the embossing station and supports a panel to be embossed as it is fed in a feed direction through the embossing station, first and second anvil rolls beneath the aperture in the work support member, and first and second pluralities of embossing wheels above the first and second anvil rolls respectively, the embossing wheels of the first plurality being spaced apart longitudinally of the first anvil roll and each defining a nip with the first anvil roll, the embossing wheels of the second plurality being spaced apart longitudinally of the second anvil roll and each defining a nip with the second anvil roll, and the embossing wheels of the first plurality being staggered with respect to the embossing wheels of the second plurality,
    a drive mechanism coupled to the anvil rolls for driving the anvil rolls to feed the panel in the nips through the embossing station in said feed direction, and
    a heater upstream of the embossing station with respect to said feed direction for supplying heat energy to a plurality of localized hot zones of the panel without contact with the panel, the hot zones being aligned with the embossing wheels respectively along said feed direction so that the panel is heated in respective hands as it is fed toward the embossing station.

20. A method of embossing a panel employing an embossing station which includes a work support member which defines an aperture at the embossing station and supports a panel to be embossed as it is fed in a feed direction through the embossing station, an anvil roll beneath the aperture in the work table, and a plurality of embossing wheels above the anvil roll, the embossing wheels being spaced apart longitudinally of the anvil roll and each defining a nip with the anvil roll, the method comprising:
    feeding the panel on the work support member through the embossing station in said feed direction,
    creating a plurality of localized hot zones upstream of the embossing station with respect to said feed direction, the hot zones being aligned with the embossing wheels respectively along said feed direction so that the panel is heated in respective bands as it is fed toward the embossing station.

21. A method according to claim 20, wherein the embossing pressure is 15–100 psi.

22. A method according to claim 20, wherein the panel is rectangular and the method comprises feeding the panel through the embossing station in said feed direction in a first pass, turning the panel through 90° and feeding the panel through the embossing station in said feed direction in a second pass.

23. A method according to claim 20, comprising employing a plurality of rams to urge the embossing wheels toward the anvil roll and create embossing pressure, and wherein the rams are actuated by a common fluid pressure.

24. A method according to claim 20, wherein each embossing wheel embosses the panel to the same depth.

25. A method according to claim 20, comprising creating the localized hot zones by directing hot air toward the panel.

26. A method according to claim 20, wherein the feed speed in 2–15 m/min.

27. A method according to claim 26, wherein the feed speed is 8–15 m/min.

28. A method according to claim 20, wherein the hot zone is at a temperature of 50–120° C.

29. A method according to claim 28, wherein the panel temperature at the hot zone increases by 20–50° C. when the panel is fed toward the embossing station.

* * * * *